United States Patent
Lu et al.

(10) Patent No.: US 12,409,380 B2
(45) Date of Patent: Sep. 9, 2025

(54) MOBILE PHONE CONTROL HANDLE ASSEMBLY

(71) Applicant: DEXIN CORPORATION, New Taipei (TW)

(72) Inventors: Ho-Lung Lu, Taipei (TW); Tzu-Hua Tseng, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 283 days.

(21) Appl. No.: 18/458,115

(22) Filed: Aug. 29, 2023

(65) Prior Publication Data
US 2024/0382838 A1 Nov. 21, 2024

(30) Foreign Application Priority Data
May 19, 2023 (TW) .................. 112118604

(51) Int. Cl.
*A63F 13/24* (2014.01)
*A63F 13/23* (2014.01)
(Continued)

(52) U.S. Cl.
CPC ............. *A63F 13/24* (2014.09); *A63F 13/23* (2014.09); *H01F 27/36* (2013.01); *H02J 7/0013* (2013.01); *H02J 7/0048* (2020.01); *H02J 7/342* (2020.01)

(58) Field of Classification Search
CPC .......... A63F 13/24; A63F 13/23; H01F 27/36; H02J 7/0013; H02J 7/0048; H02J 7/342; H02J 7/0044
See application file for complete search history.

(56) References Cited

U.S. PATENT DOCUMENTS

| | | | | |
|---|---|---|---|---|
| 4,459,578 A | * | 7/1984 | Sava | G05G 9/047 345/161 |
| 6,530,838 B2 | * | 3/2003 | Ha | A63F 13/24 345/169 |

(Continued)

FOREIGN PATENT DOCUMENTS

| | | | | |
|---|---|---|---|---|
| EP | 3 903 895 A1 | * | 11/2019 | A63F 13/22 |
| WO | WO 2014/123828 A1 | * | 8/2014 | G06F 1/16 |
| WO | WO 2021/163557 A1 | * | 8/2021 | G06F 3/045 |

OTHER PUBLICATIONS

Machine translation of publication CN 103581392 A, application CN 2013-10185637 A, obtained from STIC, Jul. 1, 2025.*

(Continued)

*Primary Examiner* — David L Lewis
*Assistant Examiner* — Matthew D Hoel
(74) *Attorney, Agent, or Firm* — Li & Cai Intellectual Property Office

(57) ABSTRACT

A mobile phone control handle assembly is suitable for holding a mobile phone, and is connected to the mobile phone. The mobile phone control handle assembly includes a handle body, a control module, two handle auxiliary accessories, and at least two magnetic shielding members. The handle body is used to hold the mobile phone. The handle body includes buttons and joysticks. When at least one of the buttons and the joysticks is pressed, the control module transmits a corresponding control signal to the mobile phone. The two handle auxiliary accessories are respectively and detachably fixed on two gripping parts of the handle body through magnets. The two magnetic shielding members are used to shield magnetic fields of the magnets. The two handle auxiliary accessories are configured to enhance a gripping experience of a user when gripping the two gripping parts.

10 Claims, 8 Drawing Sheets

(51) Int. Cl.
  *H01F 27/36* (2006.01)
  *H02J 7/00* (2006.01)
  *H02J 7/34* (2006.01)

(56) References Cited

U.S. PATENT DOCUMENTS

| | | | | |
|---|---|---|---|---|
| 7,580,728 | B2* | 8/2009 | Vance | A63F 13/22 455/575.1 |
| 7,653,771 | B2* | 1/2010 | Liberty | G06F 1/1632 463/37 |
| 7,733,637 | B1* | 6/2010 | Lam | G06F 3/0202 361/679.08 |
| 7,833,097 | B1* | 11/2010 | Maddox | A63F 13/23 463/47 |
| 8,417,296 | B2* | 4/2013 | Caballero | H04W 52/367 455/566 |
| 8,529,357 | B2* | 9/2013 | Joynes | G06F 3/0219 463/47 |
| 8,547,340 | B2* | 10/2013 | Sizelove | A63F 13/98 345/173 |
| 8,944,912 | B2* | 2/2015 | Joynes | G06F 1/1632 463/36 |
| 8,972,617 | B2* | 3/2015 | Hirschman | G06F 3/023 463/37 |
| 9,529,447 | B2* | 12/2016 | Hodges | A63F 13/24 |
| 9,808,713 | B1* | 11/2017 | Townley | A63F 13/98 |
| 10,194,509 | B2* | 1/2019 | Jorgensen | H05B 47/1965 |
| 10,335,676 | B2* | 7/2019 | Gohara | A63F 13/24 |
| 10,471,346 | B2* | 11/2019 | Yamashita | A63F 13/56 |
| 10,596,459 | B2* | 3/2020 | Kurihara | A63F 13/25 |
| 10,661,163 | B2* | 5/2020 | Gohara | A63F 13/57 |
| 10,816,976 | B2* | 10/2020 | Kamalakantha | G08C 17/00 |
| 10,868,436 | B1* | 12/2020 | Chen | H01M 50/296 |
| 11,167,209 | B2* | 11/2021 | Lu | A63F 13/98 |
| D945,531 | S* | 3/2022 | Wen | D21/333 |
| D973,774 | S* | 12/2022 | Day | D21/333 |
| 11,565,173 | B2* | 1/2023 | Black | G06F 3/023 |
| 11,628,352 | B2* | 4/2023 | Black | A63F 13/24 463/37 |
| 11,640,221 | B2* | 5/2023 | Kakinoki | G06F 3/04166 345/174 |
| 11,707,670 | B2* | 7/2023 | Khaira | A63F 13/214 463/37 |
| 11,794,099 | B1* | 10/2023 | Kamentser | A63F 13/92 |
| 11,826,642 | B2* | 11/2023 | Khaira | A63F 13/23 |
| 11,839,810 | B2* | 12/2023 | Khaira | A63F 13/24 |
| 11,911,694 | B1* | 2/2024 | Townley | A63F 13/92 |
| 11,934,718 | B2* | 3/2024 | Harada | G06F 3/1211 |
| 12,061,750 | B1* | 8/2024 | Harmon | B60K 35/00 |
| 12,070,678 | B2* | 8/2024 | Maker | A63F 13/92 |
| 12,074,946 | B2* | 8/2024 | Wei | A63F 13/48 |
| 12,115,443 | B2* | 10/2024 | Khaira | A63F 13/92 |
| 12,121,800 | B2* | 10/2024 | Maker | A63F 13/285 |
| 12,263,400 | B2* | 4/2025 | Lake | A63F 13/92 |
| 12,268,956 | B2* | 4/2025 | Khaira | A63F 13/25 |
| 12,303,775 | B2* | 5/2025 | Yeo | A63F 13/98 |
| 12,324,983 | B2* | 6/2025 | O'Connor | A63F 13/92 |
| 12,346,505 | B2* | 7/2025 | Nishizawa | G06F 3/04883 |
| 2005/0107165 | A1* | 5/2005 | Mendelson | A63F 13/22 463/6 |
| 2005/0225530 | A1* | 10/2005 | Evans | A63F 13/22 345/156 |
| 2006/0252537 | A1* | 11/2006 | Wu | A63F 13/92 463/36 |
| 2009/0033522 | A1* | 2/2009 | Skillman | G06F 1/1692 341/23 |
| 2011/0084657 | A1* | 4/2011 | Toya | H02J 7/0044 320/108 |
| 2011/0199325 | A1* | 8/2011 | Payne | G06F 3/041 345/173 |
| 2011/0230178 | A1* | 9/2011 | Jones | H04M 1/0241 455/566 |
| 2011/0234154 | A1* | 9/2011 | Navid | H02J 7/0045 320/108 |
| 2011/0260969 | A1* | 10/2011 | Workman | G06F 3/0202 345/161 |
| 2013/0005401 | A1* | 1/2013 | Rosenhan | H04M 1/724092 455/557 |
| 2013/0052956 | A1* | 2/2013 | McKell | H04M 1/05 361/679.41 |
| 2013/0095925 | A1* | 4/2013 | Xu | G06F 1/206 463/37 |
| 2013/0184077 | A1* | 7/2013 | Galpern | A63F 13/24 463/37 |
| 2013/0267322 | A1* | 10/2013 | South | A63F 13/24 463/37 |
| 2014/0094309 | A1* | 4/2014 | Osawa | G06F 3/038 463/37 |
| 2014/0206451 | A1* | 7/2014 | Helmes | A63F 13/23 463/39 |
| 2014/0247246 | A1* | 9/2014 | Maus | G06F 3/0393 345/174 |
| 2014/0302921 | A1* | 10/2014 | Smith | A63F 13/23 463/31 |
| 2015/0084900 | A1* | 3/2015 | Hodges | A63F 13/2145 345/173 |
| 2016/0361641 | A1* | 12/2016 | Koizumi | A63F 13/2145 |
| 2019/0197272 | A1* | 6/2019 | Paolizzi | G06K 7/10881 |

OTHER PUBLICATIONS

Machine translation of publication, JP 3241602 U, application JP 2023-000454 U, obtained from STIC, Jul. 1, 2025.*
Machine translation of publication JP 2023-514961 A, application JP 2022-543580, obtained from STIC, Jul. 1, 2025.*
Machine translation of publication CN 206980054 U, application CN 2017-20517196 U, obtained from STIC, Jul. 1, 2025.*
Machine translation of publication JP 2009-146737 A, application JP 2007-322964, obtained from STIC, Jul. 1, 2025.*
Machine translation of publication TW 1599389, application TW 105101455 A, obtained from STIC, Jul. 1, 2025.*
Machine translation of publicaiton JP 2022-517614 A, application JP 2021-540522, obtained from STIC, Jul. 1, 2025.*
Machine translation of publication JP 2016-511885 A, application JP 2015-556215, obtained from STIC, Jul. 1, 2025.*

* cited by examiner

MOBILE PHONE CONTROL HANDLE ASSEMBLY

CROSS-REFERENCE TO RELATED PATENT APPLICATION

This application claims the benefit of priority to Taiwan Patent Application No. 112118604, filed on May 19, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a control handle assembly, and more particularly to a mobile phone control handle assembly.

BACKGROUND OF THE DISCLOSURE

For convenience of carrying, a conventional game handle for being mounted on a mobile phone has a relatively small overall volume. Hence, when gripping the game handle, a user may have a poor gripping experience and a poor operating experience.

SUMMARY OF THE DISCLOSURE

In response to the above-referenced technical inadequacy, the present disclosure provides a mobile phone control handle assembly to improve a poor gripping experience and a poor operating experience of a conventional game handle.

In order to solve the above-mentioned problem, one of the technical aspects adopted by the present disclosure is to provide a mobile phone control handle assembly, which is suitable for holding a mobile phone and being connected to the mobile phone. The mobile phone control handle assembly includes a handle body, a control module, two handle auxiliary accessories, and at least two magnetic shielding members. The handle body includes a connection mechanism and two gripping parts. The connection mechanism and the two gripping parts are configured to jointly hold the mobile phone. The two gripping parts are connected to the connecting mechanism, and the two gripping parts are respectively located on two opposite sides of the connection mechanism. Each of the gripping parts includes a plurality of operating elements disposed on a side surface thereof, and each of the gripping parts includes at least one first magnetic attraction member disposed on another side surface thereof. The control module is disposed in the handle body. The control module is configured to connect to the mobile phone, and the control module is configured to transmit a control signal to the mobile phone. The control signal is generated by operating at least one of the operating elements. Each of the handle auxiliary accessories includes an accessory body and at least one second magnetic attraction member. The accessory body of each of the handle auxiliary accessories is capable of being magnetically attracted to the first magnetic attraction member of one of the gripping parts through the second magnetic attraction member thereof, so as to be fixedly arranged on the another side surface of the one of the gripping parts. The two handle auxiliary accessories are configured to improve a gripping experience for a user on gripping the two gripping parts. A position adjacent to the second magnetic attraction member of each of the handle auxiliary accessories and the first magnetic attraction member of a corresponding one of the gripping parts is provided with at least one of the magnetic shielding members, and each of the magnetic shielding members is configured to reduce an influence of magnetic fields of the first magnetic attraction member and the second magnetic attraction member adjacent thereto on the mobile phone.

Therefore, in the mobile phone control handle assembly provided by the present disclosure, by virtue of "the two handle auxiliary accessories", the user can have an improved gripping experience and an improved operating experience after mounting the mobile phone on the handle body and fixing the two handle auxiliary accessories on the two gripping parts of the handle body. In this way, the problem of poor gripping experience in the conventional game handle that is mounted on the mobile phone can be effectively solved. In addition, by virtue of "the magnetic shielding members", an antenna or a magnetic sensitive element of the mobile phone can be effectively prevented from being affected by the magnetic field of the first magnetic attraction member or the second magnetic attraction member. After the mobile phone is mounted on the mobile phone control handle assembly, the antenna or related magnetic sensitive elements of the mobile phone are not affected by the first magnetic attraction member or the second magnetic attraction member.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
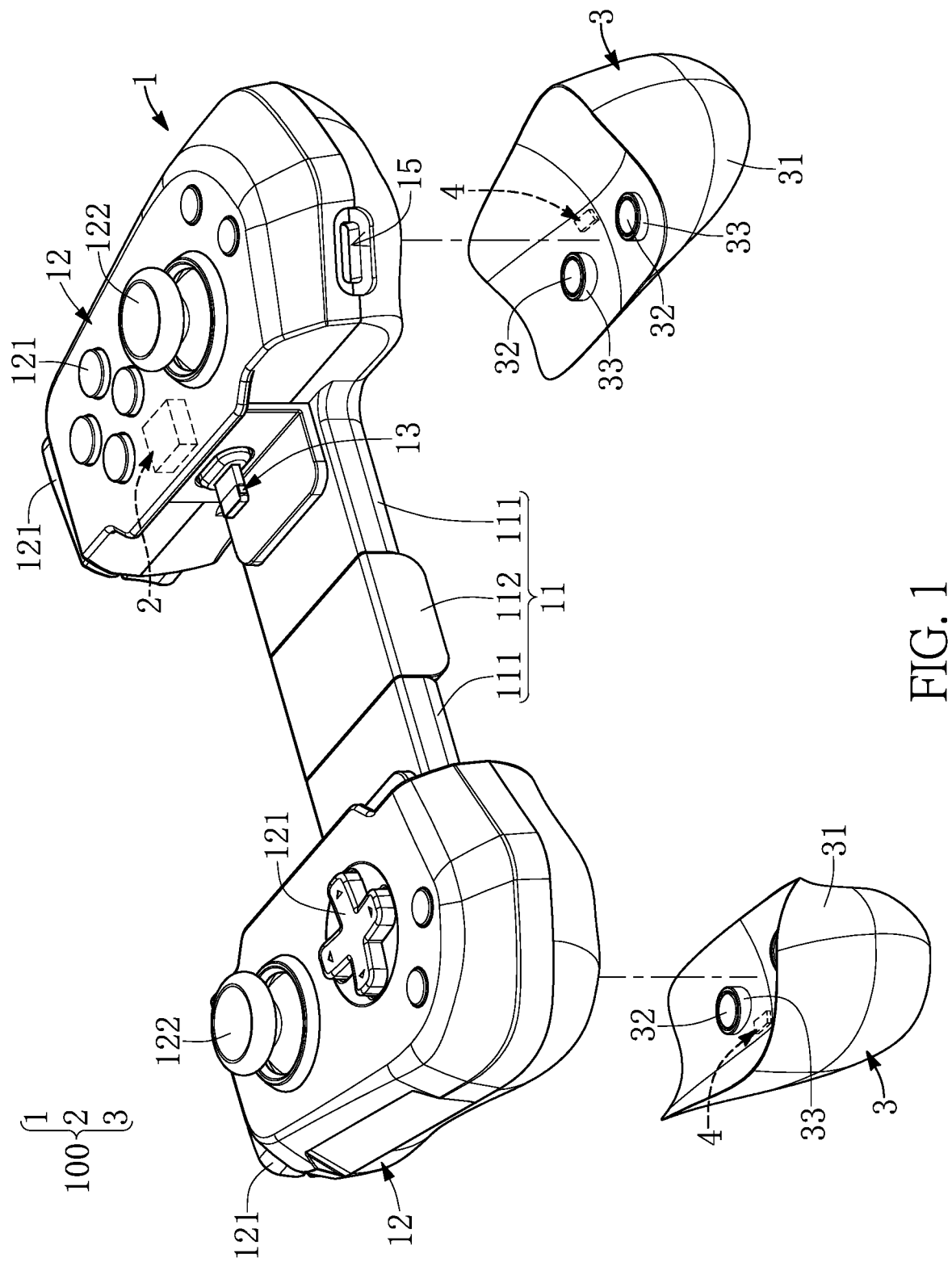
FIGS. 1 to 3 are schematic exploded views of a mobile phone control handle assembly according to an embodiment of the present disclosure from different viewing angles.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
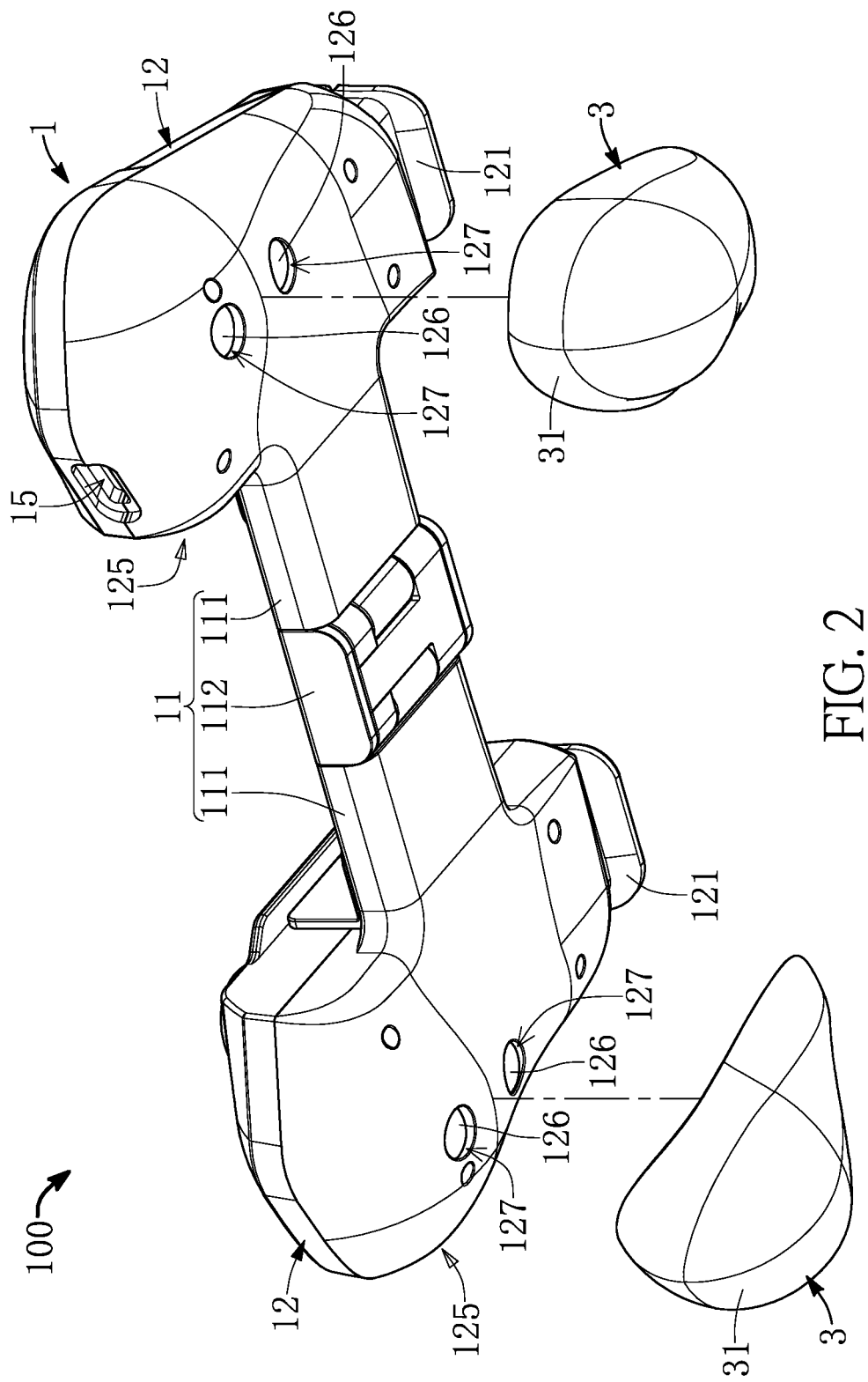
Figure 3:
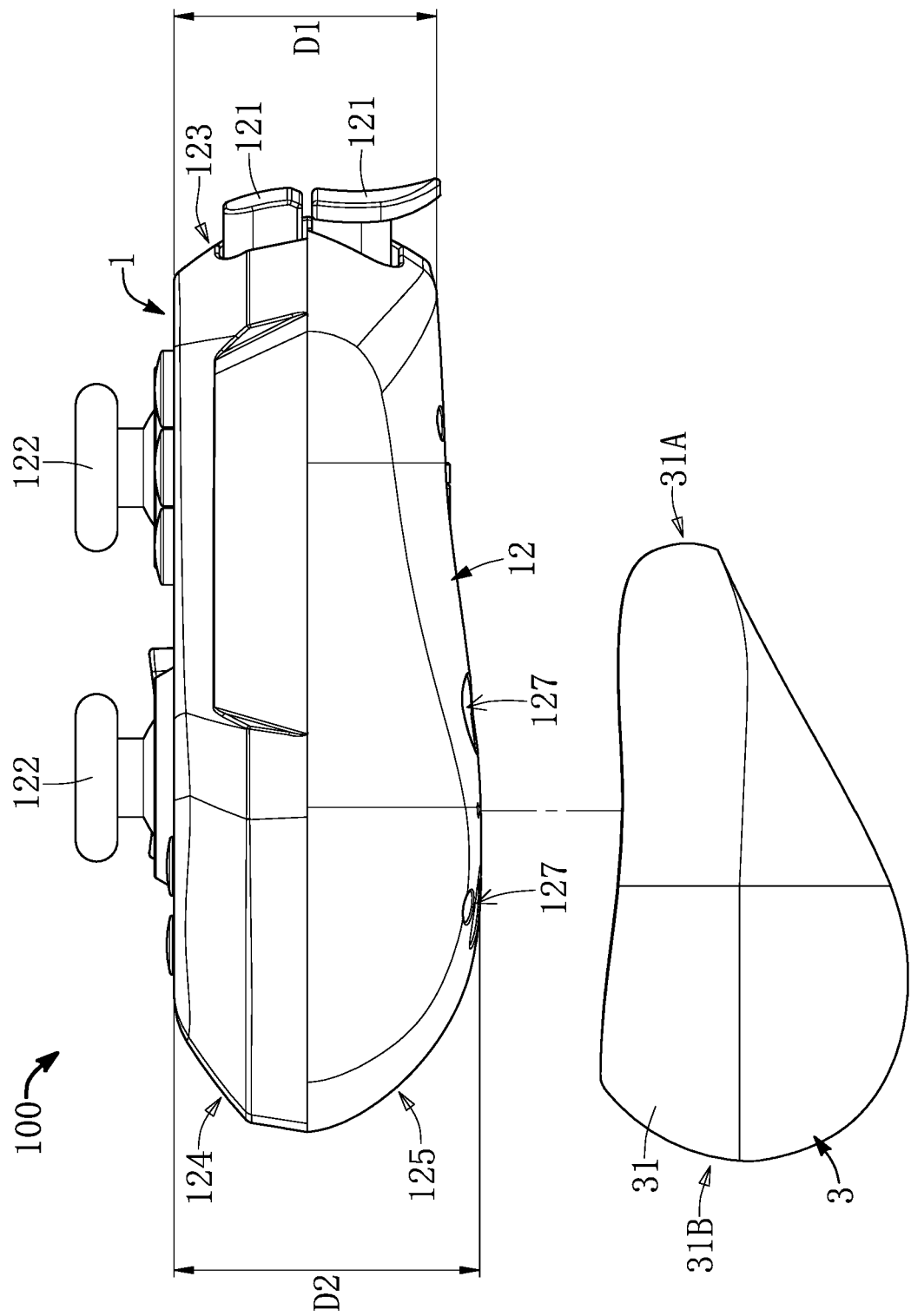
Figure 4:
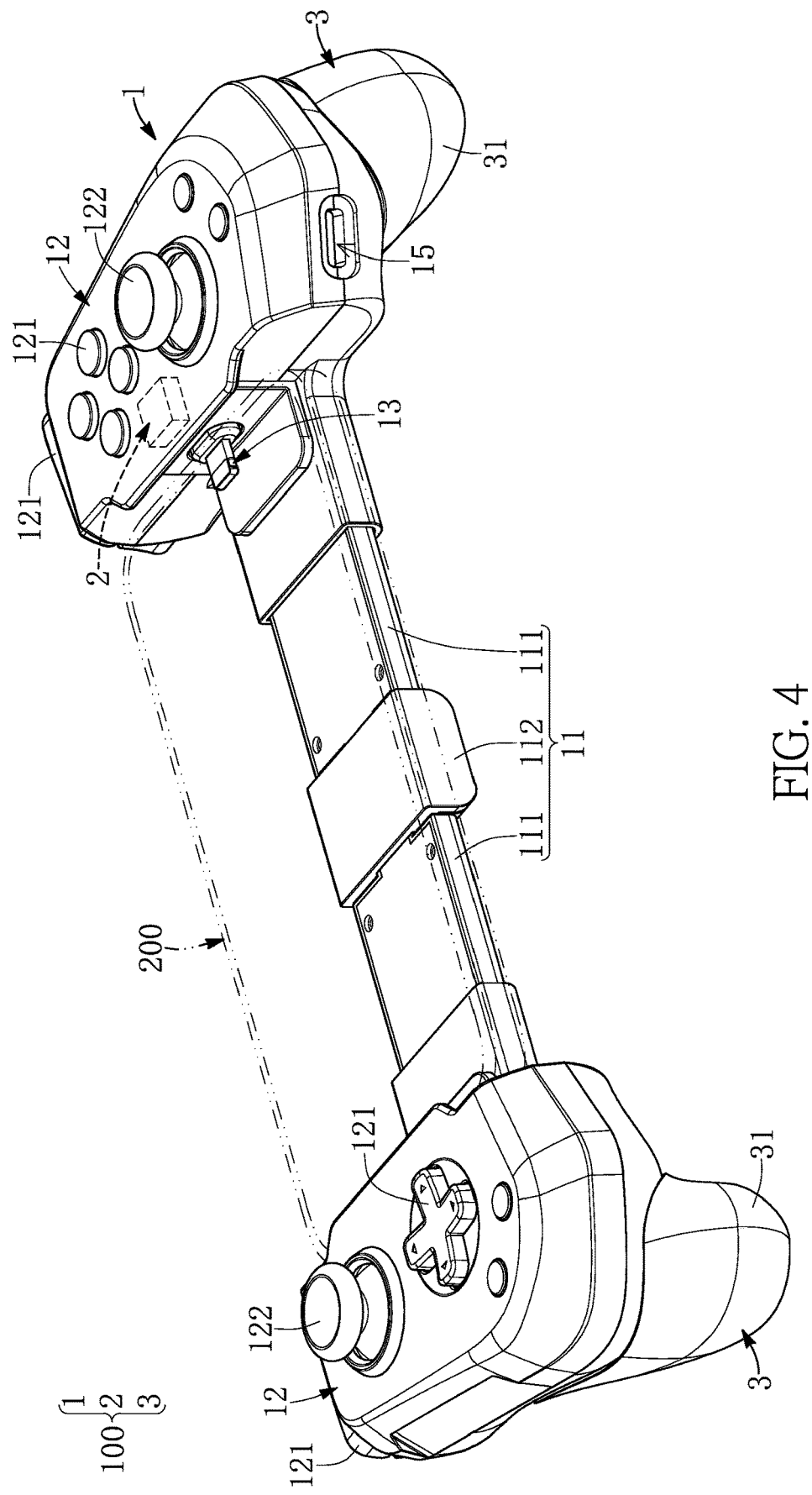
FIGS. 4 and 5 are schematic assembled views of the mobile phone control handle assembly according to the embodiment of the present disclosure from different viewing angles.
Figure 5:
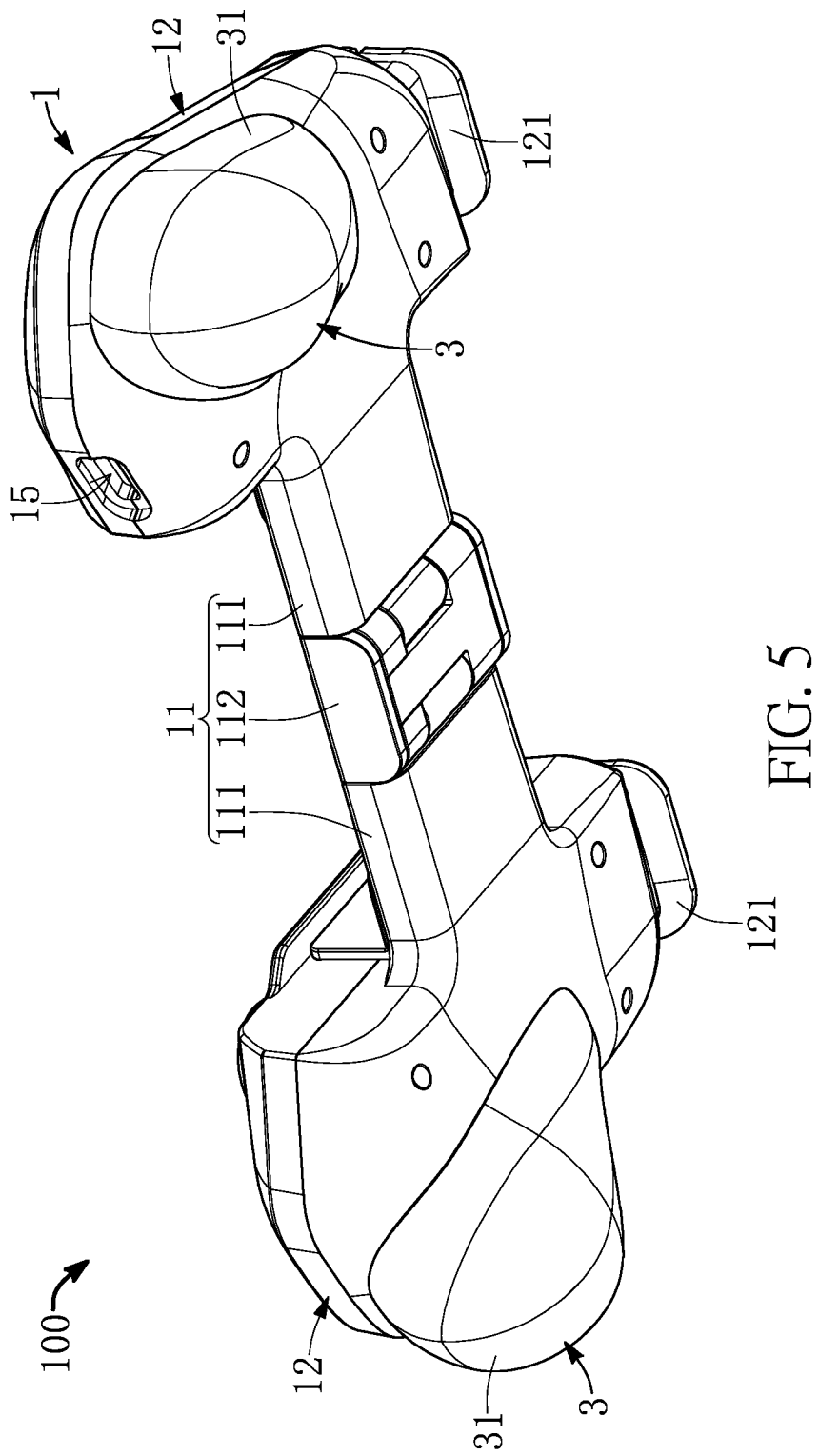
Figure 6:
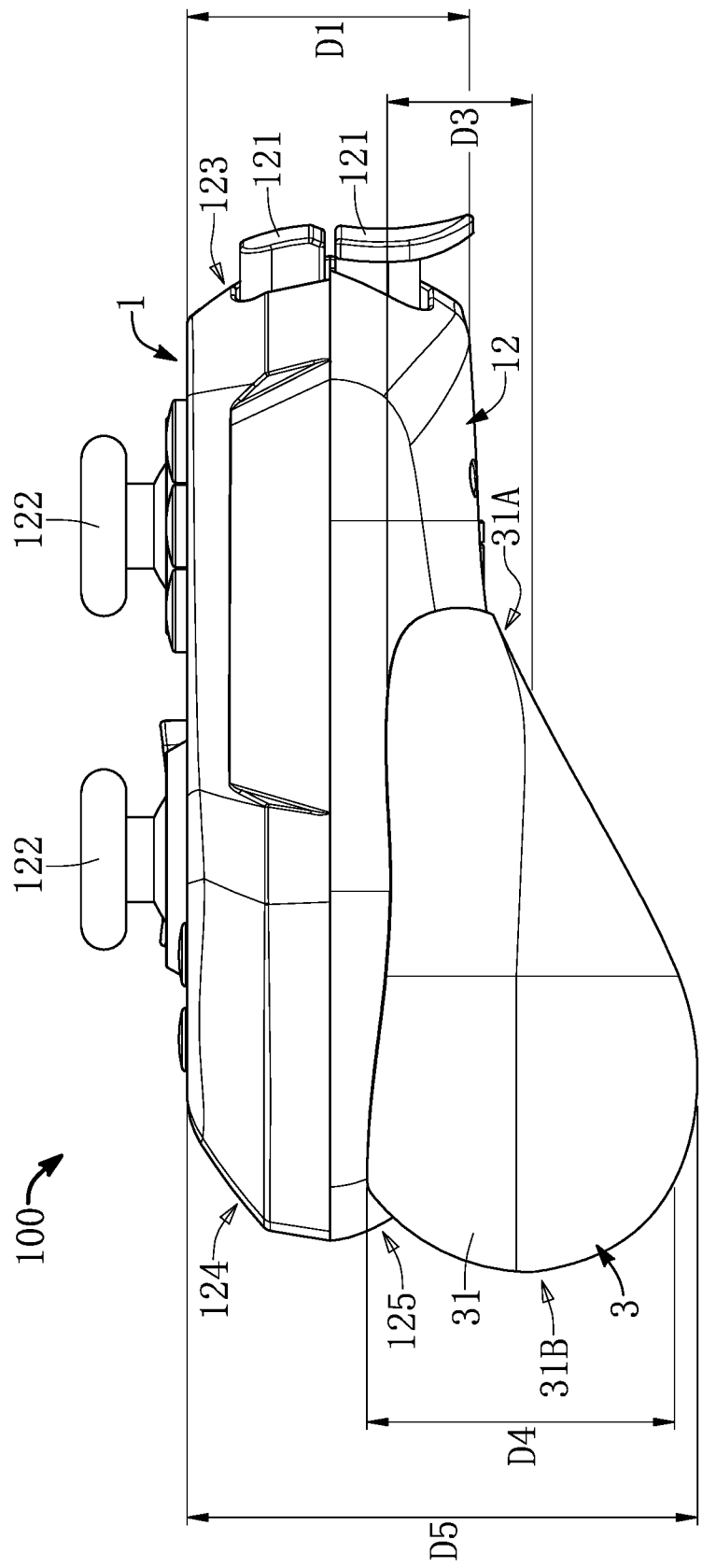
FIG. 6 is a schematic side view of the mobile phone control handle assembly according to the embodiment of the present disclosure.

Reference is made to FIGS. 1 to 6. FIGS. 1 to 3 are respectively disassembled schematic views of different viewing angles of a mobile phone control handle assembly according to an embodiment of the present disclosure. FIGS. 4 and 5 are respectively assembled schematic views of different viewing angles of the mobile phone control handle assembly according to the embodiment of the present disclosure. FIG. 6 is a schematic side view of the mobile phone control handle assembly according to the embodiment of the present disclosure.

A mobile phone control handle assembly 100 of the embodiment of the present disclosure is suitable for holding a mobile phone 200, and is electrically and/or signally connected to the mobile phone 200. The mobile phone control handle assembly 100 includes a handle body 1, a control module 2, two handle auxiliary accessories 3, and two magnetic shielding members 4. The handle body 1 includes a connection mechanism 11 and two gripping parts 12. The two gripping parts 12 are connected to each other through the connection mechanism 11. An external shape and an internal structure of the connection mechanism 11 are not specifically limited in the present disclosure.

In a specific embodiment of the present disclosure, the connection mechanism 11 includes two connection components 111 and a pivot component 112 pivotally connected between the two connection components 111. The two gripping parts 12 are connected to each other through two ends of the two connection components 111 and the pivot component 112. Through the pivot component 112, one of the two gripping parts 12 and one of the two connection components 111 that is connected thereto can be operated by a user to rotate relative to another one of the two gripping parts 12 and another one of the two connection components 111. The handle body 1 further includes a connector 13 that is disposed on one of the two gripping parts 12 (i.e., the gripping part 12 at a right side of FIG. 1). The connector 13 can be used to connect to a connection hole of the mobile phone 200. For example, the connector 13 can be a Universal Serial Bus Type-C (USB-C), a micro-USB connector, or a Lightning connector from Apple, Inc., but the present disclosure is not limited thereto.

It should be noted that, in another embodiment of the present disclosure, the connection mechanism 11 does not include the pivot component 112. Alternatively, the connection mechanism 11 includes components such as rails and/or sliders. The two gripping parts 12 can move towards or away from each other through the rails and/or the sliders. After the two gripping parts 12 are operated to move towards each other through the rails and/or the sliders, an overall width of the handle body 1 can be reduced. Accordingly, the mobile phone control handle assembly 100 can be convenient for being carried around by the user.

In still another embodiment of the present disclosure, the handle body 1 further includes a spring member. When one of the two gripping parts 12 is pulled away from another one of the two gripping parts 12, the spring member disposed in the handle body 1 generates an elastic restoring force that enables the two gripping parts 12 to firmly clamp the mobile phone 200.

Each of the gripping parts 12 further includes a plurality of operating elements. The operating elements can include, for example, a plurality of buttons 121 and at least one joystick 122. The control module 2 is disposed in the handle body 1. The control module 2 can include a circuit board, a microprocessor, and a communication chip. When any one of the buttons 121 and the joysticks 122 that are disposed on the gripping parts 12 is operated, the control module 2 can correspondingly generate and transmit a control signal to the mobile phone 200 through the connector 13 or a wireless communication member, so as to operate the mobile phone 200. For example, after the connection hole of the mobile phone 200 is connected to the connector 13 of the handle body 1 by the user, the user can grip the two gripping parts 12 by both hands, and play games installed in the mobile phone 200 by operating the buttons 121 and the joysticks 122 disposed on the two gripping parts 12. In a different embodiment, one of the operating elements included in the gripping parts 12 can be a touch pad. When the user touches the touch pad, the control module 2 can correspondingly generate and transmit another control signal to the mobile phone 200.

As shown in FIG. 3, two ends of each of the gripping parts 12 are respectively defined as a front end 123 and a rear end 124. A thickness variation of each of the gripping parts 12 is not greater than 20% from the front end 123 to the rear end 124. For example, if a minimum thickness D1 of the front end 123 of each of the gripping parts 12 is 5 centimeters (cm), a maximum thickness D2 of the rear end 124 thereof ranges from 4 centimeters to 6 centimeters. In other words, the thickness variation from the front end 123 to the rear end 124 of each of the gripping parts 12 is relatively small, which makes the handle body 1 easy to carry. However, during actual use, the user may have a poor gripping experience. Furthermore, when the user operates the buttons 121 and the joysticks 122, the user may have a poor operating experience.

It is worth mentioning that different users may have different palm sizes. When a user having a small palm size grips the handle body 1, the user may not have the poor gripping experience. However, when a user having a large palm size grips the handle body 1, the user may have the poor gripping experience. When gripping the handle body 1, the user with the poor gripping experience can further mount the two handle auxiliary accessories 3 respectively on rear sides 125 of the two gripping parts 12. Accordingly, the two handle auxiliary accessories 3 can respectively increase thicknesses of the rear ends 124 of the two gripping parts 12, so as to enhance the gripping experience and the operating experience of the user during gripping and operation of the mobile phone control handle assembly 100.

More specifically, the rear side 125 of each of the gripping parts 12 has two first magnetic attraction members 126 and two first engagement structures 127 (as shown in FIG. 1 to FIG. 3). Each of the first engagement structures 127 can be, for example, a groove. Each of the first magnetic attraction members 126 can be, for example, a magnet or a structure capable of being attracted by the magnet. Each of the first magnetic attraction members 126 is correspondingly disposed in one of the grooves (i.e., the first engagement structures 127). In each of the gripping parts 12, the quantity and location of the first magnetic attraction members 126, the quantity and location of the first engagement structures 127, and the appearance of the first engagement structures 127 are not limited to those shown in the drawings.

Each of the handle auxiliary accessories 3 includes an accessory body 31, two second magnetic attraction members 32, two second engagement structures 33, and a magnetic shielding member 4. In each of the handle auxiliary accessories 3, the quantities and locations of the second magnetic attraction members 32, the second engagement structures 33, and the magnetic shielding member 4 can be changed according to practical requirements, and are not limited to those shown in the drawings.

Two ends of the accessory body 31 are respectively defined as a front end 31A and a rear end 31B. A thickness of partial sections of the accessory body 31 gradually increases from the front end 31A to the rear end 31B. When the accessory body 31 of one of the handle auxiliary accessories 3 is fixed on the rear side 125 of one of the gripping parts 12, the rear end 31B of the accessory body 31 is located at the rear end 124 of the gripping part 12. For example, the accessory body 31 can have a minimum thickness D3 at the front end 31A, and the accessory body 31 can have a maximum thickness D4 at the rear end 31B (as shown in FIG. 6). The thickness of the accessory body 31 is gradually increased from the position where the accessory body 31 has the minimum thickness D3 to the position where the accessory body 31 has the maximum thickness D4.

Each of the second magnetic attraction members 32 and a corresponding one of the first magnetic attraction members 126 are members capable of magnetically attracting each other. For example, each of the second magnetic attraction members 32 can be a strong magnet, and a corresponding one of the first magnetic attraction members 126 can be a member capable of being attracted by the strong magnet. Conversely, the first magnetic attraction members 126 can be a strong magnet, and the second magnetic attraction members 32 can be a member capable of being attracted by the strong magnet.

Each of the second engagement structures 33 can be engaged with a corresponding one of the first engagement structures 127. The two second magnetic attraction members 32 and the two second engagement structures 33 disposed on each of the accessory bodies 31 can be respectively connected to the two first magnetic attraction members 126 and the two first engagement structures 127 of a corresponding one of the gripping parts 12. Accordingly, the accessory body 31 can be fixed in position on the rear side 125 of the gripping part 12. For example, an appearance of each of the second engagement structures 33 can be a hollow cylindrical structure, and each of the second magnetic attraction members 32 can be correspondingly disposed in the hollow cylindrical structure. As such, when each of the hollow cylindrical structures (i.e., the second engagement structure 33) is engaged with a corresponding groove (i.e., the first engagement structure 127), the second magnetic attraction member 32 is magnetically attracted to the first magnetic attraction member 126.

According to the above configuration, after the accessory body 31 is fixed to the rear side 125 of the corresponding gripping part 12 through the two second magnetic attraction members 32 and the two second engagement structures 33, the rear end 31B of the accessory body 31 is adjacent to the rear end 124 of the corresponding gripping part 12. Therefore, when the user holds the mobile phone control handle assembly 100, the user can grip the two accessory bodies 31 and the two handle parts 12 at the same time, and thus have a relatively better gripping experience (especially for the user with a large palm size).

Reference is made to FIG. 3 and FIG. 6. More specifically, when the user having a large palm size holds the handle body 1 (as shown in FIG. 3), the user may have a relatively poor gripping experience due to the thickness D2 of the handle body 1 at the rear end 124 being relatively small. At this time, the user can mount the handle auxiliary accessory 3 on the rear side 125 of the gripping part 12. When the user holds the mobile phone control handle assembly 100 (as shown in FIG. 6), the user may have a relatively better gripping experience due to the thickness D5 of the mobile phone control handle assembly 100 at the rear end 124 being obviously greater than the thickness D2 as shown in FIG. 3.

Each of the handle auxiliary accessories 3 can include at least one magnetic shielding member 4 disposed adjacent to the second magnetic attraction members 32 and the first magnetic attraction members 126 that corresponds in position to the second magnetic attraction members 32. The magnetic shielding member 4 is configured to reduce an influence of magnetic fields of the adjacent first magnetic attraction members 126 and the adjacent second magnetic attraction members 32 on the mobile phone 200. In a practical application, the magnetic shielding member 4 can be, for example, a magnetic shielding plate or a magnetic shielding block. The magnetic shielding member 4 can be disposed at a position adjacent to a member that is a magnet. For example, if the first magnetic attraction member 126 is the magnet, the magnetic shielding member 4 is disposed at a position adjacent to the first magnetic attraction member 126 on the gripping part 12. Conversely, if the second magnetic attraction member 32 is the magnet, the magnetic shielding member 4 is disposed at a position adjacent to the second magnetic attraction member 32 on the accessory body 31.

It should be noted that an upper end (i.e., an earpiece end) and a lower end of a typical smart phone usually have multiple sets of antennas and/or related magnetic sensitive elements. Therefore, when the smart phone is placed on the mobile phone control handle assembly 100 of the present disclosure, the antennas and/or the magnetic sensitive elements of the smart phone are close to the first magnetic attraction members 126 and the second magnetic attraction member 32. Hence, if the magnetic shielding member 4 is not disposed adjacent to the first magnetic attraction members 126 or the second magnetic attraction members 32, the magnetic fields of the magnets (i.e., the first magnetic attraction members 126 or the second magnetic attraction members 32) may cause interference to the antennas and/or the magnetic sensitive elements of the smart phone, thereby resulting in partial or total malfunction of the smart phone.

Based on the above, through the configuration of the two handle auxiliary accessories, the first magnetic attraction members, the second magnetic attraction members, and the magnetic shielding members, the mobile phone control handle assembly of the present disclosure can improve the gripping experience and the operating experience of the user (especially for the user with a large palm size) during gripping and operation of the mobile phone control handle assembly. Moreover, the first magnetic attraction members and the second magnetic attraction members can be prevented from interfering with the antennas and/or the magnetic sensitive elements of the smart phone.

Figure 7:
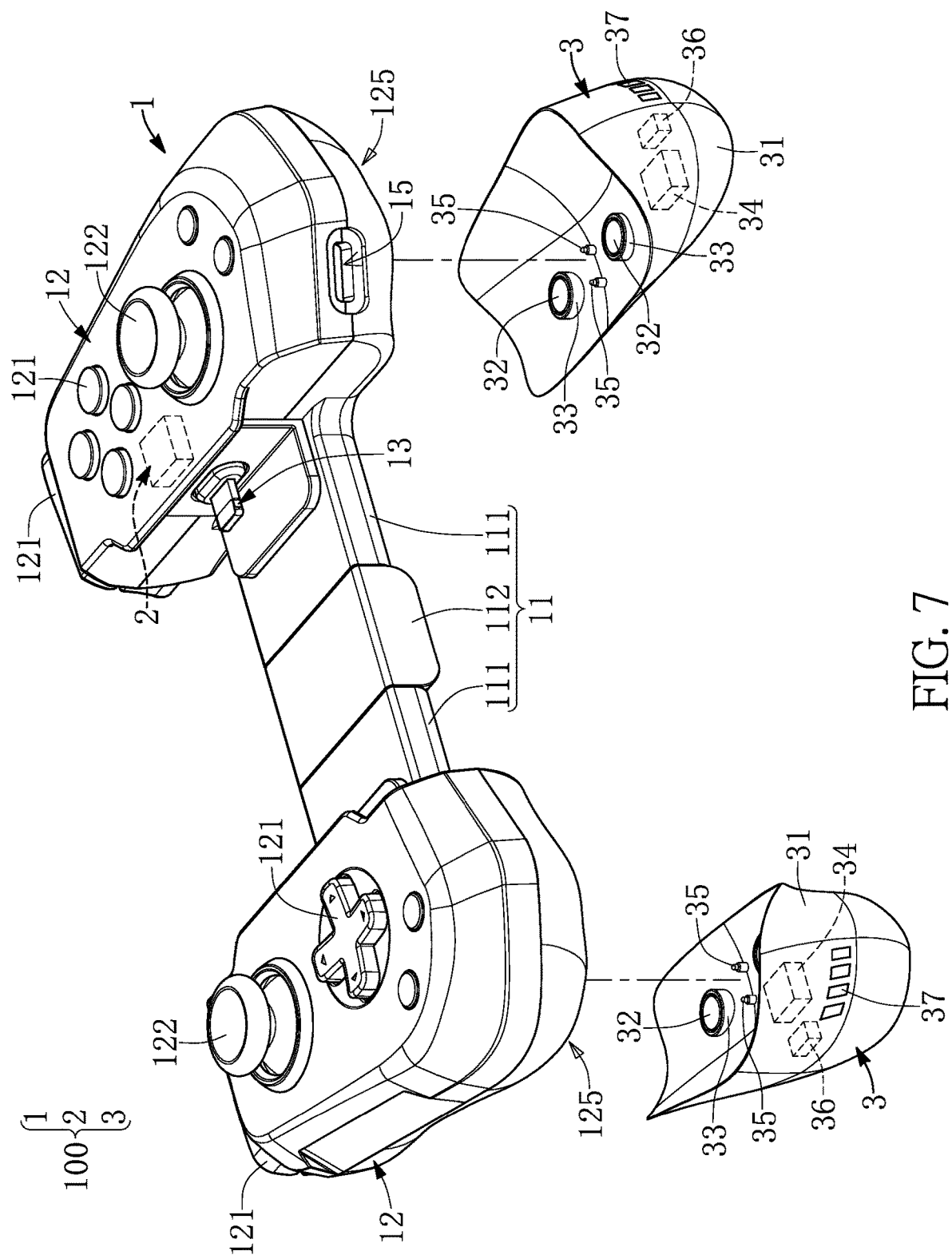
FIG. 7 and FIG. 8 are schematic exploded views of the mobile phone control handle assembly according to another embodiment of the present disclosure from different viewing angles.
Figure 8:
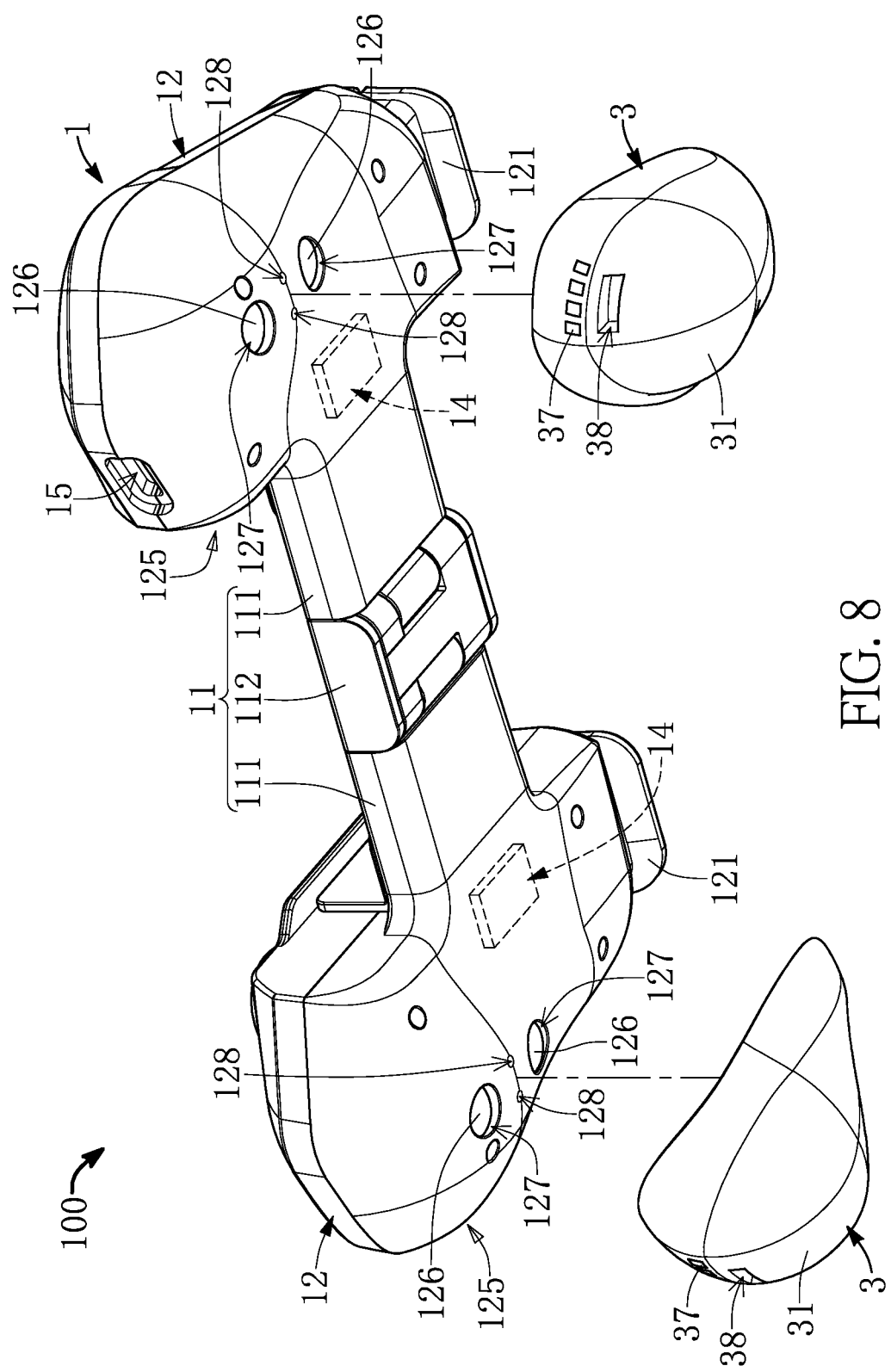

Referring to FIG. 7 and FIG. 8, FIG. 7 and FIG. 8 are respectively disassembled schematic views of different viewing angles of a mobile phone control handle assembly according to another embodiment of the present disclosure. A first difference between the present embodiment and the previous embodiment is that the handle body 1 of the present embodiment further includes at least one first rechargeable battery 14. Each of the gripping parts 12 includes at least one first charging connection member 128. The quantity and location of the first rechargeable battery 14 disposed in the handle body 1 are not limited to those shown in the drawings.

Each of the handle auxiliary accessories 3 further includes at least one second rechargeable battery 34 and at least one second charging connection member 35. When the two handle auxiliary accessories 3 are respectively fixed on the rear sides 125 of the two gripping parts 12, the second charging connection member 35 of each of the handle auxiliary accessories 3 can be connected to the first charging connection member 128 of a corresponding one of the gripping parts 12. The control module 2 is configured to enable the second rechargeable battery 34 to charge the first rechargeable battery 14, or to enable the first rechargeable battery 14 to charge the second rechargeable battery 34. The specific structures of the first charging connection member 128 and the second charging connection member 35 can be, for example, various electrical connection structures (i.e., various metal contacts).

It should be noted that, in the present embodiment, each of the accessory bodies 31 includes one second rechargeable battery 34 disposed therein and two second charging connection members 35 disposed thereon, but the present disclosure is not limited thereto. In a different embodiment, out of the two accessory bodies 31, only one of the accessory bodies 31 includes the second rechargeable battery 34 and the second charging connection members 35, and another one of the accessory bodies 31 does not include the second rechargeable battery 34 and the second charging connection members 35. Similarly, in the present embodiment, each of the gripping parts 12 includes two first charging connection members 128, but the present disclosure is not limited thereto. In a different embodiment, only one of the gripping parts 12 includes the first charging connection members 128, and another one of the gripping parts 12 does not include the first charging connection members 128.

In another embodiment, the control module 2 can decide to enable the first rechargeable battery 14 to charge the second rechargeable battery 34, or enable the second rechargeable battery 34 to charge the first rechargeable battery 14 according to a first remaining battery power of the first rechargeable battery 14 of the handle body 1 and a second remaining battery power of the second rechargeable battery 34 of each of the handle auxiliary accessories 3.

Specifically, after the two handle auxiliary accessories 3 are respectively fixed on the rear sides 125 of the two gripping parts 12 by the user, the control module 2 can, for example, firstly obtain the first remaining battery power of the first rechargeable battery 14 and the second remaining battery power of the second rechargeable battery 34. Then, if the control module 2 determines that the first remaining battery power of the first rechargeable battery 14 is greater than a predetermined percentage (i.e., greater than 80%) and the second remaining battery power of the second rechargeable battery 34 is less than a predetermined percentage (i.e., less than 20%), the control module 2 controls the first rechargeable battery 14 to charge the second rechargeable battery 34. Conversely, if the control module 2 determines that the second remaining battery power of the second rechargeable battery 34 is greater than the predetermined percentage (i.e., greater than 80%) and the first remaining battery power of the first rechargeable battery 14 is less than the predetermined percentage (i.e., less than 20%), the control module 2 controls the second rechargeable battery 34 to charge the first rechargeable battery 14. Naturally, how the control module 2 determines a charging method of the first rechargeable battery 14 and the second rechargeable battery 34 according to the first remaining battery power of the first rechargeable battery 14 and the second remaining battery power of the second rechargeable battery 34 can be designed and changed based on actual needs. The above description is merely one illustrative example.

A second difference between the present embodiment and the previous embodiment is that the handle body 1 of the present embodiment further includes a charging port 15. The charging port 15 is electrically connected to the control module 2. An external power source can charge the first rechargeable battery 14 through the charging port 15. The control module 2 can control the second rechargeable battery 34 not to charge the first rechargeable battery 14 when the charging port 15 is connected to the external power source. In a practical application, when the control module 2 determines that the charging port 15 is connected to the external power source, and when the first remaining battery power of the first rechargeable battery 14 is charged to reach a predetermined percentage (i.e., 100%) or exceed another predetermined percentage (i.e., 90%), the control module 2 can control the external power source to further charge the second rechargeable battery 34. Naturally, in a different embodiment, when the charging port 15 is connected to the external power source, the control module 2 can also control the external power source to charge the first rechargeable battery 14 and the second rechargeable battery 34 at the same time.

A third difference between the present embodiment and the previous embodiment is that each of the handle auxiliary accessories 3 of the present embodiment further includes a processor 36 disposed in the accessory body 31, and includes a battery indicator 37 and a charging port 38 arranged on the accessory body 31. The processor 36 is electrically connected to the second rechargeable battery 34. The processor 36 can control the battery indicator 37 according to the second remaining battery power of the second rechargeable battery 34, so that the battery indicator 37 can display the second remaining battery power corresponding to the second rechargeable battery 34. That is, the user can connect the charging port 38 of each of the accessory bodies 31 with a relevant connecting wire, so that the external power source can charge the second rechargeable battery 34. By monitoring the battery indicator 37, the user can find out whether or not the second rechargeable battery 34 has been charged completely. The second rechargeable battery 34 is electrically connected to the charging port 38. The external power can charge the second rechargeable battery 34 through the charging port 38.

It is worth mentioning that the battery indicator 37 can display only whether or not the second rechargeable battery 34 is charged completely, or the battery indicator 37 can also display a battery power percentage of the second rechargeable battery 34, but the present disclosure is not limited thereto.

The multiple differences of the present embodiment from the previous embodiment are not limited to being co-existent. Each difference can also be incorporated into the previous embodiment to form a new embodiment with the different feature.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mobile phone control handle assembly, which is suitable for holding a mobile phone and is connected to the mobile phone, the mobile phone control handle assembly comprising:
   a handle body including a connection mechanism and two gripping parts, wherein the connection mechanism and the two gripping parts are configured to jointly hold the mobile phone, the two gripping parts are connected to the connecting mechanism, and the two gripping parts are respectively located on two opposite sides of the connection mechanism; wherein each of the gripping parts includes a plurality of operating elements disposed on a side surface thereof, and each of the gripping parts includes at least one first magnetic attraction member disposed on another side surface thereof;
   a control module disposed in the handle body, wherein the control module is configured to connect to the mobile phone, the control module is configured to transmit a control signal to the mobile phone, and the control signal is generated by operating at least one of the operating elements;
   two handle auxiliary accessories, each of the handle auxiliary accessories including an accessory body and at least one second magnetic attraction member, wherein the accessory body of each of the handle auxiliary accessories is capable of being magnetically attracted to the first magnetic attraction member of one of the gripping parts through the second magnetic attraction member, so as to be fixedly arranged on the another side surface of the one of the gripping parts; wherein the two handle auxiliary accessories are configured to enhance a gripping experience of a user when gripping the two gripping parts; and
   at least two magnetic shielding members, wherein at least one of the magnetic shielding members is disposed at a position adjacent to the second magnetic attraction member of each of the handle auxiliary accessories and the first magnetic attraction member of a corresponding one of the gripping parts, and each of the magnetic shielding members is configured to reduce an influence of magnetic fields of the adjacent first magnetic attraction member and the adjacent second magnetic attraction member on the mobile phone.

2. The mobile phone control handle assembly according to claim 1, wherein each of the gripping parts has at least one first engagement structure, each of the accessory bodies has at least one second engagement structure, and the second engagement structure of each of the accessory bodies is engageable with the first engagement structure of a corresponding one of the gripping parts, so that each of the accessory bodies is capable of being fixed to a corresponding one of the gripping parts.

3. The mobile phone control handle assembly according to claim 2, wherein, in each of the gripping parts, the first magnetic attraction member is disposed in the first engagement structure; wherein, in each of the handle auxiliary accessories, the second magnetic attraction member is disposed in the second engagement structure; wherein, in each of the gripping parts and a corresponding one of the handle auxiliary accessories, the first magnetic attraction member and the second magnetic attraction member are magnetically attracted to each other when the first engagement structure is engaged with the second engagement structure.

4. The mobile phone control handle assembly according to claim 1, wherein the handle body further includes a first rechargeable battery, each of the gripping parts includes a first charging connection member, and at least one of the handle auxiliary accessories further includes at least one second rechargeable battery and a second charging connection member; wherein, when the second charging connection member is connected to the first charging connection member, electric energy of the second rechargeable battery is provided to at least one of the control module and the first rechargeable battery through the second charging connection member and the first charging connection member.

5. The mobile phone control handle assembly according to claim 4, wherein, when each of the accessory bodies is fixed to one of the gripping parts through the second magnetic attraction member, the second charging connection member is connected to the first charging connection member, and the control module enables electric energy of the first rechargeable battery to be transferred to the second rechargeable battery through the first charging connection member and the second charging connection member, so as to charge the second rechargeable battery.

6. The mobile phone control handle assembly according to claim 5, wherein the control module is electrically connected to the first rechargeable battery, and the control module is electrically connected to the second rechargeable battery through the first charging connection member and the second charging connection member; wherein, according to a first remaining battery power of the first rechargeable battery and a second remaining battery power of the second rechargeable battery, the control module determines whether to enable the first rechargeable battery to charge the second rechargeable battery, or to enable the second rechargeable battery to charge the first rechargeable battery.

7. The mobile phone control handle assembly according to claim 4, wherein the handle body further includes a charging port, the charging port is electrically connected to the control module, an external power source is capable of charging the first rechargeable battery through the charging port, and the control module is configured to control the second rechargeable battery not to charge the first rechargeable battery when the charging port is connected to the external power source.

8. The mobile phone control handle assembly according to claim 4, wherein each of the accessory bodies further includes a charging port, the second rechargeable battery is electrically connected to the charging port, and an external power source is capable of charging the second rechargeable battery through the charging port.

9. The mobile phone control handle assembly according to claim 4, wherein each of the accessory bodies further includes a processor and a battery indicator, the processor is electrically connected to the second rechargeable battery, and the processor is configured to control the battery indicator according to a remaining battery power of the second rechargeable battery, so that the battery indicator displays the remaining battery power of the second rechargeable battery.

10. The mobile phone control handle assembly according to claim 1, wherein two opposite ends of each of the accessory bodies are respectively defined as a front end and a rear end, and a thickness of partial sections of each of the accessory bodies is gradually increased from the front end to the rear end; wherein, when each of the accessory bodies is fixed on a rear side of one of the gripping parts, the rear end of the accessory body is located at a rear end of the handle body; wherein two opposite ends of each of the gripping parts are respectively defined as a front end and a rear end, and a thickness variation from the front end to the rear end of each of the gripping parts is not greater than 20%.

\* \* \* \* \*